United States Patent
Gelez et al.

(10) Patent No.: US 8,038,122 B2
(45) Date of Patent: Oct. 18, 2011

(54) DEVICE AND METHOD FOR CONTROLLING A VALVE WITH CONSUMABLE ENERGY MONITORING

(75) Inventors: Nicolas Gelez, Le Pecq (FR); Boris Bouchez, Saint Germain en Laye (FR); Jean-Guiherm Dalissier, Cergy (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 421 days.

(21) Appl. No.: 12/443,640

(22) PCT Filed: Sep. 28, 2007

(86) PCT No.: PCT/FR2007/001589
§ 371 (c)(1),
(2), (4) Date: Mar. 30, 2009

(87) PCT Pub. No.: WO2008/040865
PCT Pub. Date: Apr. 10, 2008

(65) Prior Publication Data
US 2009/0218531 A1 Sep. 3, 2009

(30) Foreign Application Priority Data
Oct. 3, 2006 (FR) ...................................... 0608635

(51) Int. Cl.
*F16K 31/02* (2006.01)
(52) U.S. Cl. .............. 251/129.04; 251/129.1; 123/90.11
(58) Field of Classification Search ............. 251/129.01, 251/129.04, 129.09, 129.1; 123/90.11
See application file for complete search history.

(56) References Cited

U.S. PATENT DOCUMENTS

| | | | |
|---|---|---|---|
| 5,797,360 A * | 8/1998 | Pischinger et al. | 123/90.11 |
| 5,799,630 A | 9/1998 | Moriya et al. | |
| 6,076,490 A * | 6/2000 | Esch et al. | 123/90.11 |
| 6,152,094 A * | 11/2000 | Kirschbaum | 123/90.11 |
| 6,397,797 B1 * | 6/2002 | Kolmanovsky et al. | 123/90.11 |
| 6,681,728 B2 * | 1/2004 | Haghgooie et al. | 123/90.11 |
| 6,741,441 B2 * | 5/2004 | Hilbert et al. | 361/160 |
| 6,994,060 B2 * | 2/2006 | Yoeda | 123/90.11 |
| 7,014,167 B2 * | 3/2006 | Fuwa | 251/129.04 |

FOREIGN PATENT DOCUMENTS

| | | |
|---|---|---|
| DE | 195 26 683 A1 | 1/1997 |
| DE | 198 07 875 A1 | 8/1999 |
| DE | 199 02 664 A1 | 8/2000 |
| EP | 0 987 406 A1 | 3/2000 |
| EP | 1 162 349 A2 | 12/2001 |
| EP | 1 241 325 A1 | 9/2002 |
| WO | 00/77349 A1 | 12/2000 |
| WO | 00/79548 A2 | 12/2000 |

OTHER PUBLICATIONS

International Search Report for PCT/FR2007/001589 mailed Feb. 14, 2008 (6 pages).

\* cited by examiner

*Primary Examiner* — John Fristoe, Jr.
(74) *Attorney, Agent, or Firm* — Osha • Liang LLP

(57) ABSTRACT

The invention relates to a device for controlling a valve (1) between an opened position and a closed position, that includes a valve actuation organ (8), an elastic system (17, 20) for oscillating the actuation organ between two end positions, at least one electromagnet (14, 15) associated with a control unit (23) for attracting the actuation organ towards its end positions, wherein the control unit supplies power to the electromagnet for attracting the actuation organ into a first end position when the required energy amount is at most equal to a threshold and for allowing the actuation organ to move back to the other end position when this amount is higher than the threshold. The invention also relates to a control method.

10 Claims, 2 Drawing Sheets

DEVICE AND METHOD FOR CONTROLLING A VALVE WITH CONSUMABLE ENERGY MONITORING

The present invention relates to a device and a method for controlling a valve, such as a valve of a combustion engine used to propel a motor vehicle.

BACKGROUND OF THE INVENTION

A valve control device is designed to move said valve between an open position and a closed position in order, depending on whether the valve is an inlet valve or an exhaust valve, either to admit fuel into a combustion chamber of the engine or to exhaust the burnt gases resulting from the combustion of the fuel.

A control device such as this generally comprises a valve actuating member that can move between two extreme positions corresponding to the valve open and valve closed positions, and an elastic system designed to cause the actuating member to oscillate between the two extreme positions. This elastic system generally comprises two antagonistic springs, namely a first spring acting on the actuating member in order to return it toward the extreme position corresponding to the open position and a second spring acting on the valve in order to return it to the closed position and therefore also to return the actuating member toward the extreme position corresponding to the closed position. The elastic system is in equilibrium when the actuating member is in a substantially central position between its extreme positions. The control device further comprises electromagnets associated with a control unit in order to attract the actuating member toward one or other of its extreme positions. The control unit is programmed to drive the electromagnets by employing a method of slaving the electromagnet supply current to an actuating member position.

The principle of operation of this control device is to use the elastic system to move the actuating member toward its extreme positions and to use each electromagnet to complete the movement of the actuating member toward one of its extreme positions and keep it in this extreme position.

Disturbances, such as a back pressure, excessive friction, electrical noise, etc. may impair the operation of the control device to such an extent that the actuating member escapes the attractive force exerted by one of the electromagnets attracting it toward the corresponding extreme position and tends to set off again toward its other extreme position. The control unit then powers the electromagnet in such a way as to increase the force of attraction and force the actuating member to return to the initially intended extreme position.

The power consumption of the electromagnets is then particularly high and the actuating member cannot be recovered which means that there is a risk that the valve will be uncontrollable for long enough to appreciably impair the correct operation of the engine.

SUBJECT OF THE INVENTION

It is an object of the invention to propose a means making it possible to set aside the aforementioned disadvantages of the present-day systems.

SUMMARY OF THE INVENTION

To this end, the invention provides a device for controlling a valve between an open position and a closed position, comprising:

- a valve actuating member able to move between two extreme positions corresponding to the valve open and valve closed positions,
- an elastic system to cause the actuating member to oscillate between the two extreme positions,
- at least one electromagnet associated with a control unit to attract the actuating member toward one or other of its extreme positions, the control unit being designed to:
- during an oscillation toward one of the extreme positions, determine an amount of energy needed by the electromagnet in order to bring the actuating member into this extreme position,
- if this amount of energy is at most equal to a predetermined threshold amount, power the electromagnet to complete the oscillation and bring the actuating member into this extreme position,
- if this amount of energy is above the predetermined threshold amount, allow the actuating member to set off again toward the other extreme position.

Thus, the control unit does not systematically attempt to return the actuating member to its initially intended extreme position but may, when the expenditure of energy that would be required is greater than a predetermined threshold amount, decide to leave the valve to set off again toward the other extreme position. It then becomes possible to return more quickly to a normal cycle whilst limiting the consumption of energy.

For preference, if the amount of energy is above the predetermined threshold amount, the control unit is designed to power the electromagnet in such a way as to attract the actuating member into the other extreme position and keep it there.

Thus, the actuating member is already in position for the next part of the cycle.

In particular, when the amount of energy needed by the electromagnet to bring the actuating member into the extreme position corresponding to the valve open position is greater than the predetermined threshold amount, the control unit is designed to power the electromagnet in such a way as to bring the actuating member into the extreme position corresponding to the closed position.

This proves to be relatively safe and in particular prevents an uncontrolled valve from interfering with the piston when the valve is in the open position.

Advantageously, if the amount of energy is greater than the predetermined threshold amount, the control unit is designed to power the electromagnet in such a way as to amplify the oscillation toward the other extreme position.

Thus, by amplifying the oscillation toward the other extreme position, the next oscillation toward the initially intended extreme position is also amplified which means that the amount of energy that the electromagnet will need in order to bring the actuating member into its initially intended extreme position will be lower than was previously needed.

In particular, when the amount of energy needed by the electromagnet to bring the actuating member into the extreme position corresponding to the closed position is greater than the predetermined threshold amount, the control unit is designed to:
- power the electromagnet in such a way as to amplify the oscillation toward the extreme position corresponding to the open position,
- and then, during the next oscillation toward the extreme position corresponding to the closed position, power the electromagnet in such a way as to attract the actuating member into this extreme position and keep it there.

This proves to be relatively safe and in particular prevents an uncontrolled valve from interfering with the piston when the valve is in the open position.

A further subject of the invention is a method of controlling a valve between an open position and a closed position, comprising the steps of causing a valve actuating member to oscillate between two extreme positions corresponding to the valve open and valve closed positions, and of bringing the actuating member in a controlled way toward one or other of its extreme positions, the method comprising the steps of:

during an oscillation toward one of the extreme positions, determining an amount of energy needed in order to bring the actuating member into this extreme position, if this amount of energy is at most equal to a predetermined threshold amount, completing the oscillation and bringing the actuating member into this extreme position, if this amount of energy is greater than the predetermined threshold amount, leaving the actuating member to set off again toward the other extreme position.

Further features and advantages of the invention will become apparent from reading the description which follows of a non-limiting particular embodiment of the invention.

BRIEF DESCRIPTION OF THE DRAWINGS

Reference will be made to the attached drawings among which.

DETAILED DESCRIPTION OF THE INVENTION

Figure 1:
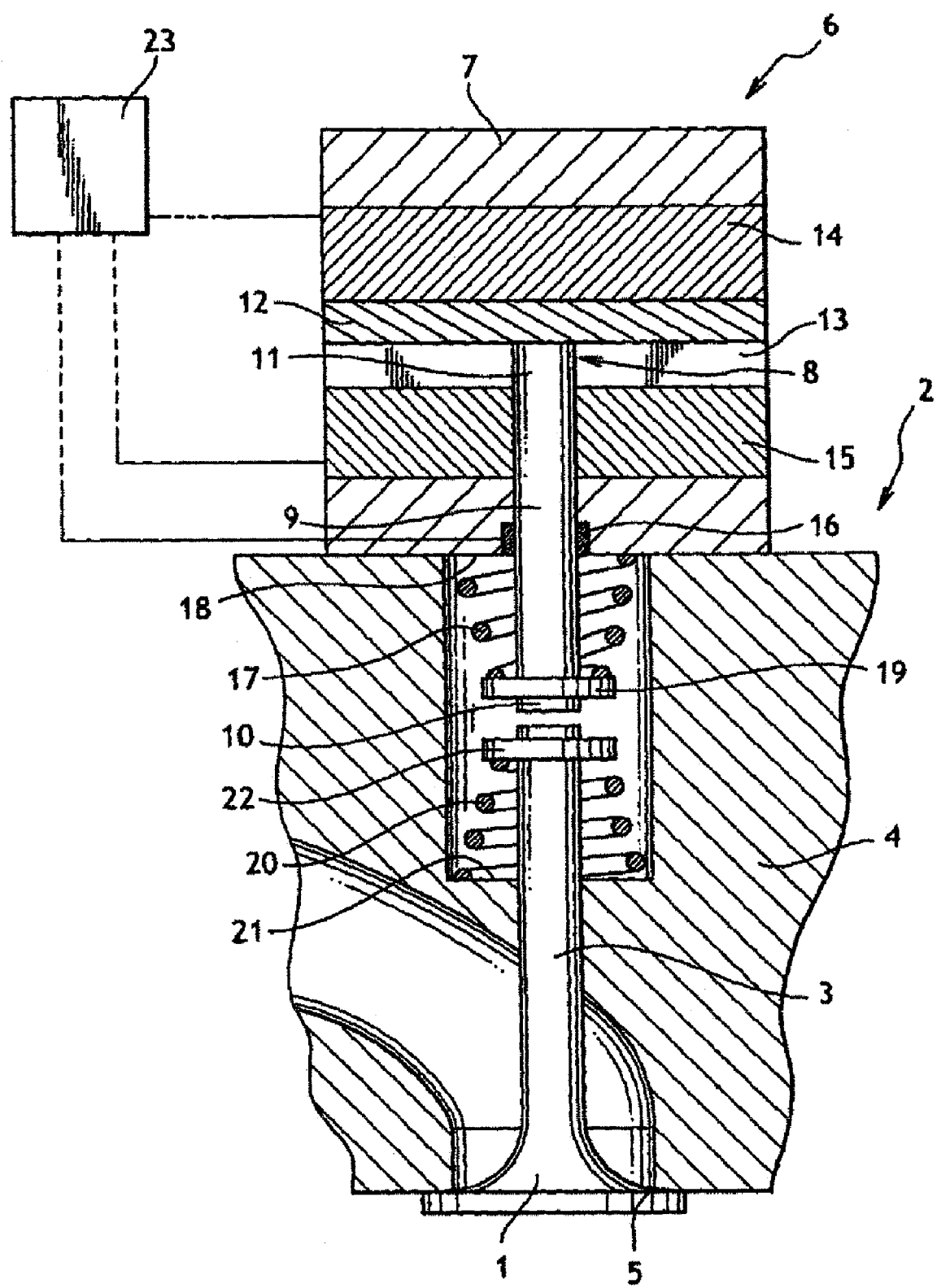
FIG. 1 is a partial schematic view of a combustion engine equipped with a valve control device according to the invention.

The invention is described here in an application to the actuation of a valve 1 of a combustion engine that bears the general reference 2.

The valve 1 has a stem 3 and is mounted on a cylinder head 4 of the combustion engine 2 to slide between a closed position in which the valve is pressed against a seat 5 of the cylinder head 4 and an open position in which the valve is off the seat 5 of the cylinder head 4.

The valve is actuated between these two positions by a control device, or actuator, denoted overall as 6 and mounted on the cylinder head 4 of the combustion engine 2.

The actuator comprises a body 7 in which there is mounted such that it can slide, an actuating member or mobile member, denoted overall as 8, comprising a shank 9 that has a first end 10 designed to press against a free end of the stem 3 of the valve 1 and a second end 11 secured to a blade 12 housed in a housing 13 of the body 7 to slide parallel to the shank 9.

The body 7 incorporates, in a way known per se, electromagnetic means of moving the mobile member 8.

The electromagnetic means comprise an electromagnet 14 for holding the blade 12 in a position known as the valve closed extreme position, and an electromagnet 15 for keeping the blade 12 in a position known as the valve open extreme position, which open onto two opposing faces of the housing 13 of the body 7. The blade 12 in this instance is in contact with the electromagnet 14, 15 when it is in the corresponding extreme position.

The electromagnets 14, 15 are controlled by a control unit 23 that implements a slaving method using a reference current and a rate of travel of the mobile member 8. The rate of travel of the mobile member 8 is obtained by differentiating a position signal provided by a position sensor 16 that senses the position of the shank 9. The position sensor 16 is, for example, a Hall-effect sensor known per se.

The actuator also comprises, as known per se, an elastic system for moving the mobile member 8.

The elastic system comprises, in a way known per se, a spring 17 interposed between one face 18 of the body 7 and a shoulder 19 of the shank 9 in order to return the blade 12 to the open extreme position and a spring 20 interposed between a face 21 of the cylinder head 4 and a shoulder 22 of the valve stem 3 in order to return the valve 1 to the closed position. The elastic system thus allows the mobile member 8 to be made to oscillate between the open and closed extreme positions and allows the valve 1 to be made to oscillate between the open and closed positions.

The control unit 23 is programmed to determine, at every point in the movement of the mobile member 8 toward one of its extreme positions, the energy needed to power the corresponding electromagnet 14, 15 so as to bring the mobile member 8 into this extreme position. To do that, the control unit 23 has available to it the position of the mobile member 8, the speed of the mobile member 8, and the applied current which governs the potential energy, the kinetic energy and the magnetic energy with which the movement of the mobile member 8 is endowed. The amount of energy needed is then compared against a threshold level that is predetermined, for example, as a function of electrical power consumption considerations or safety constraints in order to limit the current flowing through the electromagnets.

Figure 2:
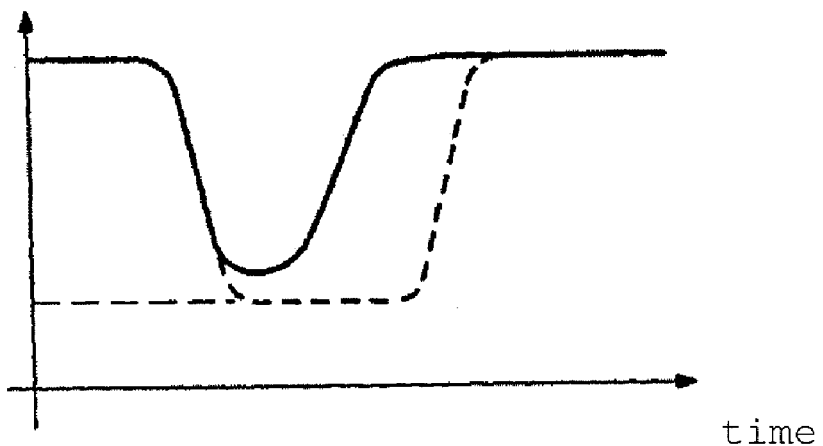
FIG. 2 is a schematic view illustrating the movement of the actuating member when attempting to recover control of the valve.

FIG. 2 illustrates an attempt at moving the mobile member 8 toward the open extreme position. The control unit 23 stops powering the electromagnet 14, the compressed spring 17 relaxes and drives the mobile member 8 toward the open extreme position and the control unit 23 powers the electromagnet 15 in order to attract the mobile member 8.

If the amount of energy needed by the electromagnet 15 to bring the mobile member 8 into its open extreme position is at most equal to a threshold amount, the control unit 23 powers the electromagnet in order to bring the mobile member 8 into its open extreme position and keep it there (this movement, depicted in dotted line in FIG. 2, corresponding to a normal mode of operation).

If the amount of energy needed is above the predetermined threshold amount, the control unit 23 lets the mobile member 8 set off again toward its closed extreme position and powers the corresponding electromagnet 14 to attract the mobile member 8 into the closed extreme position and keep it there (this movement, depicted in bold in FIG. 2, corresponding to a degraded mode of operation).

Figure 3:
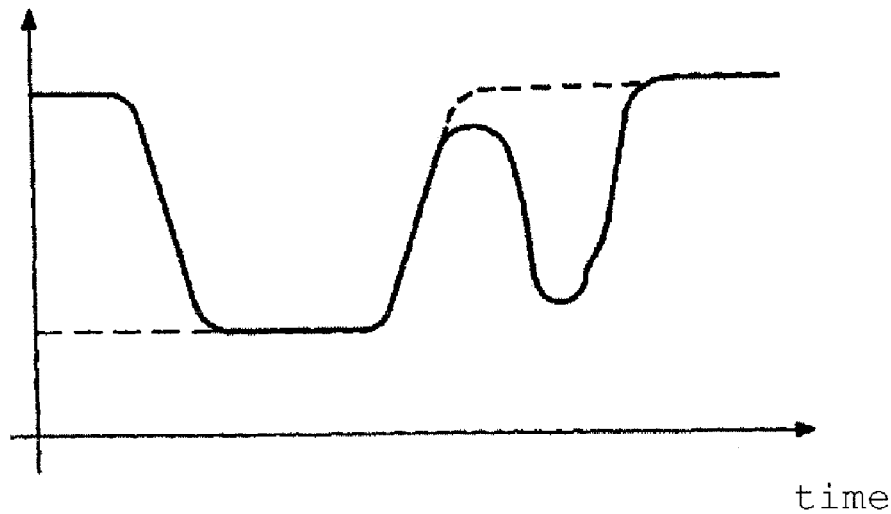
FIG. 3 is a view similar to that of FIG. 2, showing a second method of recovering control of the valve.

FIG. 3 illustrates an attempt at moving the mobile member 8 toward its closed extreme position. The control unit 23 stops powering the electromagnet 15, the spring 20 relaxes and drives the mobile member 8 toward the closed extreme position and the control unit 23 powers the electromagnet 15 to attract the member 8.

If the amount of energy needed by the electromagnet 14 to bring the mobile member 8 into position is less than or equal to the predetermined threshold amount, the control unit 23 powers the electromagnet 14 accordingly (this movement, depicted in dotted line in FIG. 3, corresponding to a normal mode of operation).

If the amount of energy needed is greater than the threshold amount, the control unit 23 lets the mobile member 8 set off again toward the open extreme position and powers the electromagnet 15 to attract the mobile member 8 toward its open extreme position so as to amplify the oscillation of the mobile member 8 to compress the spring 17 in such a way that this spring applies a stronger force to return the mobile member 8 toward its closed extreme position in the next oscillation (this movement, depicted in bold in FIG. 3, corresponding to a degraded mode of operation). The force of attraction that the electromagnet needs to apply in order to attract the mobile member 8 into its open extreme position and keep it there will then be weaker and will require an amount of energy below the predetermined threshold amount (which then constitutes a return to the normal mode of operation).

Of course, the invention is not limited to the embodiment described and embodiment variants can be made thereto without departing from the scope of the invention as defined by the claims.

In particular, although in the embodiment described the closed extreme position is favored, it is possible to favor the open extreme position or to have valve recovery modes that are the same in all instances, or alternatively to choose, for each situation, the recovery mode that is least expensive in terms of energy expenditure.

Furthermore, the actuator may have a structure other than that described and for example comprise a single electromagnet, an oscillating actuating member, etc.

The method of the invention can thus be used with a control device that employs means other than those described to cause the actuating member to oscillate or to bring the actuating member into the extreme positions and keep it there.

The invention claimed is:

1. A device for controlling a valve between an open position and a closed position, comprising:
   a valve actuating member able to move between two extreme positions corresponding to the valve open position and valve closed position,
   an elastic system to cause the actuating member to oscillate between the two extreme positions,
   at least one electromagnet associated with a control unit to attract the actuating member toward one or other of the two extreme positions,
   wherein the control unit is configured to:
      during an oscillation toward one of the extreme positions, determine an amount of energy needed by the electromagnet in order to bring the actuating member into the one extreme position,
      wherein when the amount of energy is at most equal to a predetermined threshold amount, power the electromagnet to complete the oscillation and bring the actuating member into the one extreme position, and when the amount of energy is above the predetermined threshold amount, allow the actuating member to set off again toward the other extreme position.

2. The device as claimed in claim 1, in which, when the amount of energy is above the predetermined threshold amount, the control unit is designed to power the electromagnet to attract and hold the actuating member into the other extreme position.

3. The device as claimed in claim 2, in which, when the amount of energy needed by the electromagnet to bring the actuating member into the extreme position corresponding to the valve open position is greater than the predetermined threshold amount, the control unit is configured to power the electromagnet to bring the actuating member into the extreme position corresponding to the closed position.

4. The device as claimed in claim 1, in which, when the amount of energy is greater than the predetermined threshold amount, the control unit is configured to power the electromagnet to amplify the oscillation toward the other extreme position.

5. The device as claimed in claim 4, in which, when the amount of energy needed by the electromagnet to bring the actuating member into the extreme position corresponding to the closed position is greater than the predetermined threshold amount, the control unit is configured to:
   power the electromagnet to amplify the oscillation toward the extreme position corresponding to the open position, and
   during a next oscillation toward the extreme position corresponding to the closed position, power the electromagnet to attract and hold the actuating member into the extreme position corresponding to the closed position.

6. A method of controlling a valve between an open position and a closed position, comprising:
   according to a normal mode of operation, causing a valve actuating member to oscillate between two extreme positions corresponding to a valve open position and a valve closed position,
   bringing the actuating member in a controlled way toward one or other of the two extreme positions,
      during an oscillation toward one of the two extreme positions, determining an amount of energy needed in order to bring the actuating member into the one extreme position,
      when the amount of energy is at most equal to a predetermined threshold amount, completing the oscillation and bringing the actuating member into the one extreme position, according to the normal mode of operation, and
      when the amount of energy is greater than the predetermined threshold amount, leaving the actuating member to set off again toward the other of the two extreme positions, according to a degraded mode of operation.

7. The method as claimed in claim 6, in which, when the amount of energy is above the predetermined threshold amount, the method in the degraded mode of operation further comprises bringing and holding the actuating member into the other extreme position.

8. The device as claimed in claim 7, in which, when the amount of energy needed by an electromagnet to bring the actuating member into the extreme position corresponding to the valve open position is greater than the predetermined threshold amount, the method further comprises bringing the actuating member into the extreme position corresponding to the closed position.

9. The device as claimed in claim 6, in which, when the amount of energy is greater than the predetermined threshold amount, the method in the degraded mode of operation further comprises amplifying the oscillation toward the other extreme position.

10. The device as claimed in claim 9, in which, when the amount of energy needed to bring the actuating member into the extreme position corresponding to the closed position is greater than the predetermined threshold amount, the method further comprises:
    amplifying the oscillation toward the extreme position corresponding to the open position, and
    during a next oscillation toward the extreme position corresponding to the closed position, bringing and holding the actuating member into the extreme position corresponding to the closed position.

* * * * *